United States Patent
Wang et al.

(10) Patent No.: US 11,342,753 B2
(45) Date of Patent: May 24, 2022

(54) SCHEDULING METHOD FOR POWER SYSTEM BASED ON FLEXIBLE HVDC

(71) Applicants: TSINGHUA UNIVERSITY, Beijing (CN); STATE GRID JIBEI ELECTRIC POWER COMPANY, Beijing (CN); STATE GRID CORPORATION OF CHINA, Beijing (CN)

(72) Inventors: Bin Wang, Beijing (CN); Yanling Du, Beijing (CN); Wenchuan Wu, Beijing (CN); Haitao Liu, Beijing (CN); Hongbin Sun, Beijing (CN); Weimin Sun, Beijing (CN); Zongda Mu, Beijing (CN); Chenhui Lin, Beijing (CN); Qinglai Guo, Beijing (CN)

(73) Assignees: TSINGHUA UNIVERSITY, Beijing (CN); STATE GRID JIBEI ELECTRIC POWER COMPANY, Beijing (CN); STATE GRID CORPORATION OF CHINA, Beijing (CN)

( * ) Notice: Subject to any disclaimer, the term of this patent is extended or adjusted under 35 U.S.C. 154(b) by 0 days.

(21) Appl. No.: 17/029,888

(22) Filed: Sep. 23, 2020

(65) Prior Publication Data
US 2021/0111562 A1    Apr. 15, 2021

(30) Foreign Application Priority Data

Oct. 10, 2019    (CN) .......................... 201910958436.4

(51) Int. Cl.
*G05B 19/042*    (2006.01)
*H02J 3/36*    (2006.01)
(Continued)

(52) U.S. Cl.
CPC .............. *H02J 3/36* (2013.01); *G05B 19/042* (2013.01); *H02J 3/28* (2013.01); *H02J 3/466* (2020.01);
(Continued)

(58) Field of Classification Search
None
See application file for complete search history.

(56) References Cited

U.S. PATENT DOCUMENTS

| | | | |
|---|---|---|---|
| 7,003,955 B2 * | 2/2006 | Davis | F03B 3/103 60/641.11 |
| 8,643,206 B2 * | 2/2014 | Ekern | F03B 13/06 405/76 |

(Continued)

*Primary Examiner* — Jason Lin
(74) *Attorney, Agent, or Firm* — Hodgson Russ LLP (57) ABSTRACT

The present disclosure provides a scheduling method for a power system based on flexible HVDC (high-voltage direct current) and a pumped storage power station, which belongs to a field of power system control technologies. The method is applicable in a power system having a flexible HVDC system and a pumped storage power station. By establishing a scheduling model for the power system, which contains an objective function and multiple constraints, and solving the scheduling model, a capability of the pumped storage power station is used to adjust the unstable output of the renewable energy power generator and stabilize fluctuant of the renewable energy power generation, such that a power incoming into a load center presents a stable ladder pattern and an optimal scheduling scheme can be obtained.

17 Claims, 1 Drawing Sheet

(51) Int. Cl.
*H02J 3/46* (2006.01)
*H02J 3/28* (2006.01)

(52) U.S. Cl.
CPC ... *G05B 2219/2639* (2013.01); *H02J 2203/20* (2020.01); *H02J 2300/28* (2020.01)

(56) References Cited

U.S. PATENT DOCUMENTS

| | | | |
|---|---|---|---|
| 2002/0148222 A1* | 10/2002 | Zaslavsky | F03D 1/00 60/398 |
| 2012/0297772 A1* | 11/2012 | McBride | F01K 25/06 60/649 |
| 2015/0176559 A1* | 6/2015 | Hongawa | F03B 15/14 60/398 |
| 2016/0348637 A1* | 12/2016 | Bachli | F03B 17/005 |
| 2017/0260961 A1* | 9/2017 | Mori | H02K 7/1823 |
| 2018/0100480 A1* | 4/2018 | Duquette | G05B 15/02 |
| 2018/0180019 A1* | 6/2018 | Jiang | H02J 15/003 |
| 2019/0155234 A1* | 5/2019 | Devi | H02J 3/004 |
| 2019/0170109 A1* | 6/2019 | Duquette | F04B 17/006 |
| 2019/0229546 A1* | 7/2019 | Hartl | H02J 9/062 |
| 2019/0331084 A1* | 10/2019 | Fridrich | H02J 7/0013 |
| 2020/0143489 A1* | 5/2020 | Bhattarai | G06Q 50/06 |

* cited by examiner

SCHEDULING METHOD FOR POWER SYSTEM BASED ON FLEXIBLE HVDC

CROSS-REFERENCE TO RELATED APPLICATION

The present disclosure claims priority to Chinese Patent Application No. 201910958436.4, filed Oct. 10, 2019, the entire disclosure of which is incorporated herein by reference.

TECHNICAL FIELD

The present disclosure relates to a scheduling method for a power system based on flexible HVDC, which belongs to a field of power system control technologies.

BACKGROUND

A schedule of a power system aims to guide running of the power system, which is responsible for designing an output plan of an electric generating set to ensure that the power system can realize the optimal running in the premise of satisfying requirements of electricity-use loads and guaranteeing a safety of the power system. In recent years, more and more wind power generation devices are participated in the power system. For a system fed with a large scale of renewable energy sources, an existing active power adjusting method does not consider a flexible modulation of flexible direct current, and an existing determination method cannot well adapt to a strong random fluctuation of the large scale of renewable energy sources and cannot ensure a reliable consumption.

SUMMARY

An objective of the present disclosure is to overcome a disadvantage in prior art, such that a scheduling method for a power system based on flexible HVDC (high-voltage direct current) and a pumped storage power station is provided. In the present disclosure, the pumped storage power station is used to stabilize a fluctuant of a wind power generation device, to enable a load center to receive a high quality and stable power, which may improve consumption of renewable energy and decrease an electricity cost.

A scheduling method for a power system based on flexible HVDC is provided. The method includes the following steps.

(1) Establishing a scheduling model for the power system based on flexible HVDC and a pumped storage power station, the scheduling model including an objective function and a plurality of constraints. The step has following sub steps (1-1) to (1-2).

(1-1) determining the objective function of the scheduling model for minimizing a total cost $S_{SUM}$ of the power system:

$$\min\left[S_{SUM} = \sum_{i \in I} A_i(P_i) + \sum_{i \in G} G_i(P_{Gi}) + S_{pun}\right]$$

the total cost contains a transmission cost, an electricity cost and a penalty term, the transmission cost is represented by $$\sum_{i \in I} A_i(P_i);$$

where $A_i$ represents a transmission cost function on an i-th transmission line in the power system, $P_i$ represents an active power on the i-th transmission line, and I represents a set of flexible direct current transmission branches;

$A_i = R_i P_i^2$; where $R_i$ represents line loss on the i-th transmission line;

the electricity cost is represented by $$\sum_{i \in G} G_i(P_{Gi});$$

where G represents a set of nodes connected to electric generators in the power system, and $G_i$ represents an electricity cost function of an electric generator at an i-th node, $P_{Gi}$ represents an active power of the electric generator at the i-th node;

$G_i = a_i P_{Gi}^2 + b_i P_{Gi} + c_i$; where $a_i, b_i, c_i$ represent electricity cost parameters of the electric generator at the i-th node, respectively;

the penalty term is a sum of an electricity abandoning penalty and a load tracking offset penalty, and is represented by $S_{pun} = S_1 + S_2$;

the electricity abandoning penalty is represented by $$S_1 = \alpha\left[\sum_{j \in J}(P_j - p_j)^2\right],$$

where $P_j$ represents an actual output of a j-th renewable energy power station, $p_j$ represents a predictive output of the j-th renewable energy power station; J represents of a set of renewable energy power stations; $\alpha$ represents a coefficient for the electricity abandoning penalty of the renewable energy power station;

the load tracking offset penalty is represented by $S_2 = \gamma (P_{b,t} - P_{b,t-1})^2$, $t \in T$, where $\gamma$ represents a coefficient for the load tracking offset penalty, T represents a controlled time period, $P_{b,t}$ represents a load tracking value at the time point t, $P_{b,t-1}$ represents a load tracking value at a time point t−1;

(1-2) determining the plurality of constraints, including:

(1-2-1) an electric generator's power constraint:

$$P_{Gi,min} \leq P_{Gi} - \alpha_i(u_{max} - u_0)$$

$$P_{Gi} - \alpha_i(u_{min} - u_0) \leq P_{Gi,max}$$

where i is one element from a set G representing a set of nodes connected to electric generators, $P_{Gi,min}$, $P_{Gi,max}$ represent a minimum output and a maximum output of the electric generator at an i-th node, respectively, $P_{Gi}$ represents an active power of the electric generator at the i-th node, $\alpha_i$ represents an adjustment coefficient for an automatic generation control of the electric generator at the i-th node, $u_{max}$ represents a maximum output of a renewable energy power station, $u_{min}$ represents a minimum output of the renewable energy power station, $u_0$ represents an actual output of the renewable energy power station;

(1-2-2) a renewable energy power station's power constraint:

$$w_{i,min} \leq \underline{w}$$

$$w_{i,max} \leq \overline{w}$$

-continued $$0 \leq w_{i,min} \leq w_{i,0} \leq w_{i,max}$$

$$u_0 = \sum_{i \in N_W} w_{i,0}$$

$$u_{max} = \sum_{i \in N_W} w_{i,max}$$

$$u_{min} = \sum_{i \in N_W} w_{i,min}$$

where $N_w$ represents a set of nodes connected to renewable energy power stations, $w_{i,0}$ represents a power set value of a renewable energy power station at an i-th node, $w_{i,min}$ represents a minimum output of the renewable energy power station at the i-th node, $w_{i,max}$ represents a maximum output of the renewable energy power station at the i-th node, $\underline{w}$ represents an lower limit of fluctuant of a renewable energy, $\overline{w}$ represents an upper limit of fluctuant of the renewable energy, $u_{max}$ represents a maximum output of the renewable energy power station, $u_{min}$ represents a minimum output of the renewable energy power station, $u_0$ represents an actual output of the renewable energy power station;

(1-2-3) a whole system power balance constraint:

$$\sum_{i \in N_G} P_{Gi} + \sum_{i \in N_W} w_{i,0} = \sum_{i \in N_D} P_{Di}$$

where $N_D$ represents a set of nodes connected to toads, $N_G$ represents a set of nodes connected to traditional energy power stations, $N_w$ represents a set of nodes connected to renewable energy power stations, $P_{Gi}$ represents an active power of the electric generator at an i-th node connected to a traditional energy power, $P_{Di}$ represents a load power of an i-th node connected to a load, $w_{i,0}$ represents a power set value of a renewable energy power station at an i-th node connected to a renewable energy power station;

(1-2-4) a transmission power capacity constraint:

$$-\overline{P}_L \leq \sum_{i \in N_G} G_i^L (P_{Gi} + \alpha_i u_0) +$$

$$\sum_{i \in N_W, AG_i^L > 0} AG_i^L w_{i,min} + \sum_{i \in N_W, AG_i^L < 0} AG_i^L w_{i,max} + \sum_{i \in N_D} G_i^L P_{Di}$$

$$\sum_{i \in N_G} G_i^L (P_{Gi} + \alpha_i u_0) + \sum_{i \in N_W, AG_i^L > 0} AG_i^L w_{i,max} +$$

$$\sum_{i \in N_W, AG_i^L < 0} AG_i^L w_{i,min} + \sum_{i \in N_D} G_i^L P_{Di} \leq \overline{P}_L$$

where $N_G$ represents a set of nodes connected to traditional energy power stations, $N_w$ represents a set of nodes connected to renewable energy power stations, $N_D$ represents a set of nodes connected to loads, $G_i^L$, $G_j^L$ represent power transfer distribution factors of an L-th transmission branch relative to an i-th node and a j-th node, respectively, $AG_i^l$ represents a sensitivity of the L-th transmission branch to the active power of an i-th node connected to a renewable energy power station, $P_{Gi}$ represents an actual output of an electric generator at an i-th node connected to a traditional energy power station, $\alpha_i$ represents an adjustment coefficient for an automatic generation control of the electric generator at the i-th connected to traditional energy power station, $w_{i,min}$ represents a minimum output of the renewable energy power station at the i-th node connected to a renewable energy power station, $w_{i,max}$ represents a maximum output of the renewable energy power station at the i-th node connected to a renewable energy power station, $u_0$ represents an actual output of the renewable energy power station, $P_{Di}$ represents a load power of the i-th node connected to a load;

$$AG_i^L = G_i^L - \sum_{j \in N_G} G_j^L \alpha_j,$$

where $\overline{P}_L$ represents a maximum allowable power of the L-th transmission branch, $\alpha_j$ represents an adjustment coefficient for an automatic generation control of the electric generator at the j-th node;

(1-2-5) a pumped storage power station constraint:

$$w_{u,t+1} - w_{u,t} = w_{h,t} - w_{g,t}$$

$$w_{u,min} \leq w_{u,t} \leq w_{u,max}$$

$$w_{l,t+1} - w_{l,t} = w_{g,t} - w_{h,t}$$

$$w_{l,min} \leq w_{l,t} \leq w_{l,max}$$

$$w_{h,t} = \eta_h p_{h,t}$$

$$p_{g,t} = \eta_g w_{g,t}$$

$$p_{ch.t} = B(t) p_{g,t}$$

$$p_{dis.t} = B(t) p_{g,t}$$

$$p_{ch.t} \geq 0$$

$$p_{dis.t} \geq 0$$

where $p_{g,t}$ represents a generating power of the pumped storage power station at the time point t, $w_{g,t}$ represents a water-use power of the pumped storage power station at the time point t, $\eta_g$ represents a generating efficiency of the pumped storage power station, $p_{h,t}$ represents an electricity-use power of the pumped storage power station at the time point t, $w_{h,t}$ represents a water-store power of the pumped storage power station at the time point t, $\eta_h$ represents a pumping efficiency of the pumped storage power station, $w_{u,t}$ represents a water storage of an upstream water reservoir at the time point t, $w_{u,t+1}$ represents a water storage of an upstream water reservoir at a time point t+1, $w_{u,max}$ represents a maximum water storage of the upstream water reservoir, $w_{u,min}$ represents a minimum water storage of the upstream water reservoir, $w_{l,t}$ represents a water storage of a downstream water reservoir at the time point t, $w_{l,t+1}$ represents a water storage of a downstream water reservoir at the time point t+1, $w_{l,max}$ represents a maximum water storage of the downstream water reservoir, $w_{l,min}$ represents a minimum water storage of the downstream water reservoir, $p_{ch.t}$ represents an incoming power of the pumped storage power station at the time point t, $p_{dis.t}$ represents an outgoing power of the pumped storage power station at the time point t, B represents a Boolean function;

(1-2-6) a flexible direct current constraint:

$$p_z = p_{z.i} + p_{z.o}$$

$$p_z + l_z = 0$$

$$p_z \leq S_z$$

$$r \geq |l_z/S_{zl}|$$

$$r \leq 1$$

where $p_{z.i}$, $p_{z.o}$ represent an incoming power and an outgoing power of a flexible direct current bus Z, respectively, $p_z$ represents a direct current power of the flexible direct current bus Z, $l_z$ represents a transmission power of a flexible direct current transmission line connected to the flexible direct current bus Z, r represents a maximum load rate of the flexible direct current line, $S_z$ represents a capacity of a convertor station at the flexible direct current bus Z, $S_{zl}$ represents a capacity of the flexible direct current line connected to the flexible direct current bus Z;

(2) Solving the scheduling model to obtain respective optimal solutions of $P_{Gi}$, $w_{i,0}$, $p_{g,t}$, $l_z$, so as to acquire an optimal scheduling scheme of the power system.

The present disclosure has following features and advantages.

With the scheduling method for a power system based on flexible HVDC and a pumped storage power station, the constraint conditions utilize a robust model, the pumped storage power station is used to stabilize the fluctuant of the wind power generation device to reduce the regulating loads of the wind power generation set. Further, a flexible modulation of the flexible direct current is considered to adapt to a strong random fluctuant of a large scale of high-density renewable energy sources, so as to ensure a realizable consumption of the renewable energy. Since the fluctuant of the renewable energy sources in the power system is taken into account, a cost of correcting and controlling is reduced, a flexibility of adjusting the power system is improved, and a safety of the power system is ensured, which is applicable in rolling scheduling of the power system and other scenarios.

DETAILED DESCRIPTION

The present disclosure provides a scheduling method for a power system based on flexible HVDC and a pumped storage power station, which will be described in detail below in combination with specific embodiments.

Figure 1:
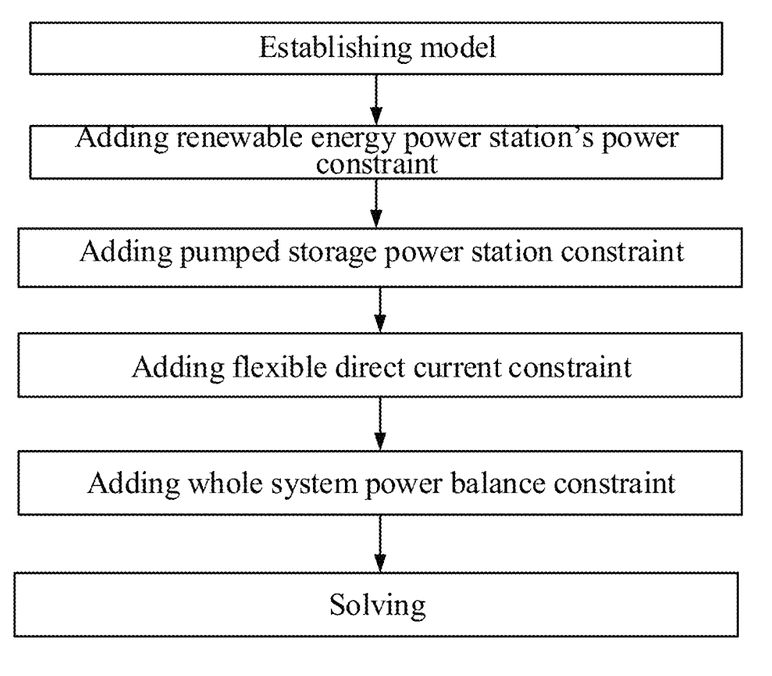
FIG. 1 is a flowchart of a scheduling method for a power system based on flexible HVDC and a pumped storage power station according to an embodiment of the present disclosure.

A scheduling method for a power system based on flexible HVDC and a pumped storage power station is provided. As illustrated in FIG. 1, the method includes the followings.

(1) Establishing a scheduling model for the power system based on flexible HVDC and the pumped storage power station, the scheduling model including an objective function and a plurality of constraints. The step has following sub steps (1-1) to (1-2).

In the present disclosure, the power system includes several renewable energy power stations (typically, wind power generation stations and PV power stations), a large pumped storage power station, several traditional energy power stations, and a load center.

(1-1) determining the objective function of the scheduling model for minimizing a total cost $S_{SUM}$ of the power system:

$$\min\left[S_{SUM} = \sum_{i \in I} A_i(P_i) + \sum_{i \in G} G_i(P_{Gi}) + S_{pun}\right]$$

The total cost contains a transmission cost, an electricity cost and a penalty term, the transmission cost is represented by $$\sum_{i \in I} A_i(P_i);$$

where $A_i$ represents a transmission cost function on an i-th transmission line in the power system, $P_i$ represents an active power on the i-th transmission line, which is a quantity to be solved, and I represents a set of flexible direct current transmission branches, which is a known quantity.

The transmission cost function on the i-th transmission line can be expressed by:

$$A_i = R_i P_i^2;$$

where $R_i$ represents line loss on the i-th transmission line, which is a known quantity.

The electricity cost is represented by $$\sum_{i \in G} G_i(P_{Gi});$$

where $G_i$ represents an electricity cost function of an electric generator at an i-th node of the power system, $P_{Gi}$ represents an active power of the electric generator at the i-th node, which is a quantity to be solved, and G represents a set of nodes connected to electric generators in the power system, which can be obtained from connected positions of all the electric generators in the power system, and is a known quantity.

The electricity cost function of the electric generator at the i-th node can be expressed by:

$$G_i = a_i P_{Gi}^2 + b_i P_{Gi} + c_i$$

where $a_i, b_i, c_i$ represent electricity cost parameters of the electric generator at the i-th node, respectively, which are known quantities.

The penalty term is a sum of an electricity abandoning penalty and a load tracking offset penalty, and is represented by $S_{pun} = S_1 + S_2$.

The electricity abandoning penalty is represented by $$S_1 = \alpha\left[\sum_{j \in J}(P_j - p_j)^2\right],$$

where $P_j$ represents an actual output of a renewable energy power station j, which is a quantity to be solved, $p_j$ represents a predictive output of the renewable energy power station j; J represents of a set of renewable energy power stations; α represents a coefficient for the electricity abandoning penalty of the renewable energy power station The load tracking offset penalty is represented by $S_2 = \gamma(P_{b.t} - P_{b.t-1})^2$, $t \in T$, where γ represents a coefficient for the load tracking offset penalty, which is a known quantity. T represents a controlled time period, which is a known quantity. $P_{b,t}$ represents a load tracking value at a time point t.

(1-2) determining the plurality of constraints, including:
(1-2-1) an electric generator's power constraint:

$$P_{Gi,min} \leq P_{Gi} - \alpha_i(u_{max} - u_0)$$

$$P_{Gi} - \alpha_i(u_{min} - u_0) \leq P_{Gi,max}$$

where i is one element from a set G representing a set of nodes connected to electric generators, $P_{Gi,min}$, $P_{Gi,max}$ represent a minimum output and a maximum output of the electric generator at the i-th node, respectively, which are known quantities. $P_{Gi}$ represents an actual output of the electric generator at the i-th node, which is a quantity to be solved. $\alpha_i$ represents an adjustment coefficient for an automatic generation control of the electric generator at the i-th node, which is a known quantity. $u_{max}$ represents a maximum output of the renewable energy power station, $u_{min}$ represents a minimum output of the renewable energy power station, $u_0$ represents an actual output of the renewable energy power station.

(1-2-2) a renewable energy power station's power constraint:

$$w_{i,min} \leq \underline{w}$$

$$w_{i,max} \leq \overline{w}$$

$$0 \leq w_{i,min} \leq w_{i,0} \leq w_{i,max}$$

$$u_0 = \sum_{i \in N_W} w_{i,0}$$

$$u_{max} = \sum_{i \in N_W} w_{i,max}$$

$$u_{min} = \sum_{i \in N_W} w_{i,min}$$

where $N_w$ represents a set of nodes connected to renewable energy power stations, $w_{i,0}$ represents a power set value of the renewable energy power station at the i-th node, which is a quantity to be solve. $w_{i,min}$ represents a minimum output of the renewable energy power station at the i-th node, which is a known quantity. $w_{i,max}$ represents a maximum output of the renewable energy power station at the i-th node, which is a known quantity. $\underline{w}$ represents an lower limit of fluctuant of a renewable energy, $\overline{w}$ represents an upper limit of fluctuant of the renewable energy;

(1-2-3) a whole system power balance constraint:

$$\sum_{i \in N_G} P_{Gi} + \sum_{i \in N_W} w_{i,0} = \sum_{i \in N_D} P_{Di}$$

where $N_D$ represents a set of nodes connected to loads, $N_G$ represents a set of nodes connected to traditional energy power stations, $N_w$ represents a set of nodes connected to renewable energy power stations, $P_{Di}$ represents a load power of an i-th node connected to the load, which is a known quantity.

(1-2-4) a transmission power capacity constraint:

$$-\overline{P}_L \leq \sum_{i \in N_G} G_i^L(P_{Gi} + \alpha_i u_0) +$$

-continued $$\sum_{i \in N_W, AG_i^L > 0} AG_i^L w_{i,min} + \sum_{i \in N_W, AG_i^L < 0} AG_i^L w_{i,max} + \sum_{i \in N_D} G_i^L P_{Di}$$

$$\sum_{i \in N_G} G_i^L(P_{Gi} + \alpha_i u_0) + \sum_{i \in N_W, AG_i^L > 0} AG_i^L w_{i,max} +$$

$$\sum_{i \in N_W, AG_i^L < 0} AG_i^L w_{i,min} + \sum_{i \in N_D} G_i^L P_{Di} \leq \overline{P}_L$$

where $G_i^L$, $G_j^L$ represent power transfer distribution factors of an L-th transmission branch relative to the i-th node and the j-th node, respectively, $AG_i^l$ represents a sensitivity of the L-th transmission branch to the active power of the i-th node.

$$AG_i^L = G_i^L - \sum_{j \in N_G} G_j^L \alpha_j,$$

where $\overline{P}_L$ represents a maximum allowable power of the L-th transmission branch, which is a known quantity.

(1-2-5) a pumped storage power station constraint:

$$w_{u,t+1} - w_{u,t} = w_{h,t} - w_{g,t}$$

$$w_{u,min} \leq w_{u,t} \leq w_{u,max}$$

$$w_{l,t+1} - w_{l,t} = w_{g,t} - w_{h,t}$$

$$w_{l,min} \leq w_{l,t} \leq w_{l,max}$$

$$w_{h,t} = \eta_h p_{h,t}$$

$$p_{g,t} = \eta_g w_{g,t}$$

$$p_{ch,t} = B(t) p_{g,t}$$

$$p_{dis,t} = B(t) p_{g,t}$$

$$p_{ch,t} \geq 0$$

$$p_{dis,t} \geq 0$$

where $p_{g,t}$ represents a generating power of the pumped storage power station at the time point t, $w_{g,t}$ represents a water-use power of the pumped storage power station at the time point t, $\eta_g$ represents a generating efficiency of the pumped storage power station, $p_{h,t}$ represents an electricity-use power of the pumped storage power station at the time point t, $w_{h,t}$ represents a water-store power of the pumped storage power station at the time point t, $\eta_h$ represents a pumping efficiency of the pumped storage power station, $w_{u,t}$ represents a water storage of an upstream water reservoir at the time point t, $w_{u,t+}$ represents a water storage of the upstream water reservoir at a time point t+1, $w_{u,max}$ represents a maximum water storage of the upstream water reservoir, $w_{u,min}$ represents a minimum water storage of the upstream water reservoir, $w_{l,t}$ represents a water storage of a downstream water reservoir at the time point t, $w_{l,t+1}$ represents a water storage of the downstream water reservoir at the time point t+1, $w_{l,max}$ represents a maximum water storage of the downstream water reservoir, $w_{l,min}$ represents a minimum water storage of the downstream water reservoir, $p_{ch,t}$ represents an incoming power of the pumped storage power station at the time point t, $p_{dis,t}$ represents an outgoing power of the pumped storage power station at the time point t, B represents a Boolean function.

(1-2-6) a flexible direct current constraint:

$$p_z = p_{z,i} + p_{z,o}$$

$$p_z + l_z = 0$$

$$p_z \leq S_z$$

$$r \geq |l_z / S_{zl}|$$

$$r \leq 1$$

where $p_{z,i}$, $p_{z,o}$ represent an incoming power and an outgoing power of a flexible direct current bus Z, respectively, $p_z$ represents a direct current power of the flexible direct current bus Z, $l_z$ represents a transmission power of a flexible direct current line connected to the flexible direct current bus Z, r represents a maximum load rate of the flexible direct current line, $S_z$ represents a capacity of a convertor station at the flexible direct current bus Z, $S_{zl}$ represents a capacity of the flexible direct current line connected to the flexible direct current bus Z.

(2) Solving the scheduling model using CPLEX to obtain respective optimal solutions of $P_{Gi}$, $w_{i,0}$, $p_{g,t}$, $l_z$, and using the respective optimal solutions in a generating control of the traditional energy power generation set, a generating control of the renewable energy power generation set, a control of the pumped storage power station and a control of the flexible direction current, so as to acquire an optimal scheduling scheme of the power system.

What is claimed is:

1. A scheduling method for a power system based on flexible high-voltage direct current (HVDC), comprising:

establishing a scheduling model for the power system based on flexible HVDC, the power system including a pumped storage power station for stabilizing fluctuant of renewable energy power stations, the scheduling model comprising an objective function and a plurality of constraints; wherein the objective function of the scheduling model is configured for minimizing a total cost $S_{SUM}$ of the power system, and the objective function is expressed by:

$$\min\left[S_{SUM} = \sum_{i \in I} A_i(P_i) + \sum_{i \in G} G_i(P_{Gi}) + S_{pun}\right]$$

wherein the total cost contains a transmission cost, an electricity cost and a penalty term, the transmission cost is represented by $$\sum_{i \in I} A_i(P_i);$$

where $A_i$ represents a transmission cost function on an i-th transmission line in the power system, $P_i$ represents an active power on the i-th transmission line, and I represents a set of flexible direct current transmission branches;

$A_i = R_i P_i^2$; where $R_i$ represents line loss on the i-th transmission line;

wherein the electricity cost is represented by $$\sum_{i \in G} G_i(P_{Gi});$$

where G represents a set of nodes connected to electric generators in the power system, and $G_i$ represents an electricity cost function of an electric generator at an i-th node, $P_{Gi}$ represents an active power of the electric generator at the i-th node;

$G_i = a_i P_{Gi}^2 + b_i P_{Gi} + c_i$; where $a_i, b_i, c_i$ represent electricity cost parameters of the electric generator at the i-th node, respectively;

wherein the penalty term is a sum of an electricity abandoning penalty and a load tracking offset penalty, and is represented by $S_{pun} = S_1 + S_2$;

wherein the plurality of constraints comprises a pumped storage power station constraint expressed by:

$$w_{u,t+1} - w_{u,t} = w_{h,t} - w_{g,t}$$

$$w_{u,min} \leq w_{u,t} \leq w_{u,max}$$

$$w_{l,t+1} - w_{l,t} = w_{g,t} - w_{h,t}$$

$$w_{l,min} \leq w_{l,t} \leq w_{l,max}$$

$$w_{h,t} = \eta_h p_{h,t}$$

$$p_{g,t} = \eta_g w_{g,t}$$

$$p_{ch,t} = B(t) p_{g,t}$$

$$p_{dis,t} = B(t) p_{g,t}$$

$$p_{ch,t} \geq 0$$

$$p_{dis,t} \geq 0$$

where $p_{g,t}$ represents a generating power of the pumped storage power station at the time point t, $w_{g,t}$ represents a water-use power of the pumped storage power station at the time point t, $\eta_g$ represents a generating efficiency of the pumped storage power station, $p_{h,t}$ represents an electricity-use power of the pumped storage power station at the time point t, $w_{h,t}$ represents a water-store power of the pumped storage power station at the time point t, $\eta_h$ represents a pumping efficiency of the pumped storage power station, $w_{u,t}$ represents a water storage of an upstream water reservoir at the time point t, $w_{u,t+1}$ represents a water storage of the upstream water reservoir at a time point t+1, $w_{u,max}$ represents a maximum water storage of the upstream water reservoir, $w_{u,min}$ represents a minimum water storage of the upstream water reservoir, $w_{l,t}$ represents a water storage of a downstream water reservoir at the time point t, $w_{l,t+1}$ represents a water storage of the downstream water reservoir at the time point t+1, $w_{l,max}$ represents a maximum water storage of the downstream water reservoir, $w_{l,min}$ represents a minimum water storage of the downstream water reservoir, $p_{ch,t}$ represents an incoming power of the pumped storage power station at the time point t, $p_{dis,t}$ represents an outgoing power of the pumped storage power station at the time point t, B represents a Boolean function;

solving the scheduling model to acquire an optimal active power $P_{Gi}$ of each electric generator at each node, an optimal power set value $w_{i,0}$ of each renewable energy power station at each node, an optimal generating power $p_{g,t}$ of the pumped storage power station at the time point t and an optimal transmission power $l_z$ of a flexible direct current transmission line connected to a flexible direct current bus Z; and operating the power system based on the optimal $P_{Gi}$, $w_{i,0}$, $p_{g,t}$, $l_z$.

2. The scheduling method of claim 1, wherein the electricity abandoning penalty is represented by $$S_1 = \alpha\left[\sum_{j \in J}(P_j - p_j)^2\right],$$

where $P_j$ represents an actual output of a j-th renewable energy power station, $p_j$ represents a predictive output of the j-th renewable energy power station; J represents of a set of renewable energy power stations; α represents a coefficient for the electricity abandoning penalty of the renewable energy power station.

3. The scheduling method of claim 1, wherein the load tracking offset penalty is represented by $S_2 = \gamma(P_{b,t} - P_{b,t-1})^2$, t∈T, where γ represents a coefficient for the load tracking offset penalty, T represents a controlled time period, $P_{b,t}$ represents a load tracking value at the time point t, $P_{b,t-1}$ represents a load tracking value at a time point t−1.

4. The scheduling method of claim 1, wherein the plurality of constraints further comprise an electric generator's power constraint;
wherein the electric generator's power constraint is expressed by:

$$P_{Gi,min} \le P_{Gi} - \alpha_i(u_{max} - u_0)$$

$$P_{Gi} - \alpha_i(u_{min} - u_0) \le P_{Gi,max}$$

where i is one element from a set G representing a set of nodes connected to electric generators, $P_{Gi,min}$, $P_{Gi,max}$ represent a minimum output and a maximum output of the electric generator at an i-th node, respectively, $P_{Gi}$ represents an active power of the electric generator at the i-th node, $\alpha_i$ represents an adjustment coefficient for an automatic generation control of the electric generator at the i-th node, $u_{max}$ represents a maximum output of a renewable energy power station, $u_{min}$ represents a minimum output of the renewable energy power station, $u_0$ represents an actual output of the renewable energy power station.

5. The scheduling method of claim 1, wherein the plurality of constraints further comprise a renewable energy power station's power constraint;
wherein the renewable energy power station's power constraint is expressed by:

$$w_{i,min} \le \underline{w}$$

$$w_{i,max} \le \overline{w}$$

$$0 \le w_{i,min} \le w_{i,0} \le w_{i,max}$$

$$u_0 = \sum_{i \in N_W} w_{i,0}$$

$$u_{max} = \sum_{i \in N_W} w_{i,max}$$

$$u_{min} = \sum_{i \in N_W} w_{i,min}$$

where $N_w$ represents a set of nodes connected to renewable energy power stations, $w_{i,0}$ represents a power set value of a renewable energy power station at an i-th node, $w_{i,min}$ represents a minimum output of the renewable energy power station at the i-th node, $w_{i,max}$ represents a maximum output of the renewable energy power station at the i-th node, $\underline{w}$ represents an lower limit of fluctuant of a renewable energy, $\overline{w}$ represents an upper limit of fluctuant of the renewable energy, $u_{max}$ represents a maximum output of the renewable energy power station, $u_{min}$ represents a minimum output of the renewable energy power station, $u_0$ represents an actual output of the renewable energy power station.

6. The scheduling method of claim 1, wherein the plurality of constraints further comprise a whole system power balance constraint;
wherein the whole system power balance constraint is expressed by:

$$\sum_{i \in N_G} P_{Gi} + \sum_{i \in N_W} w_{i,0} = \sum_{i \in N_D} P_{Di}$$

where $N_D$ represents a set of nodes connected to loads, $N_G$ represents a set of nodes connected to traditional energy power stations, $N_w$ represents a set of nodes connected to renewable energy power stations, $P_{Gi}$ represents an active power of the electric generator at an i-th node connected to a traditional energy power, $P_{Di}$ represents a load power of an i-th node connected to a load, $w_{i,0}$ represents a power set value of a renewable energy power station at an i-th node connected to a renewable energy power station.

7. The scheduling method of claim 1, wherein the plurality of constraints further comprise a transmission power capacity constraint;
wherein the transmission power capacity constraint is expressed by:

$$-\overline{P}_L \le \sum_{i \in N_G} G_i^L(P_{Gi} + \alpha_i u_0) +$$

$$\sum_{i \in N_W, AG_i^L > 0} AG_i^L w_{i,min} + \sum_{i \in N_W, AG_i^L < 0} AG_i^L w_{i,max} + \sum_{i \in N_D} G_i^L P_{Di}$$

$$\sum_{i \in N_G} G_i^L(P_{Gi} + \alpha_i u_0) + \sum_{i \in N_W, AG_i^L > 0} AG_i^L w_{i,max} +$$

$$\sum_{i \in N_W, AG_i^L < 0} AG_i^L w_{i,min} + \sum_{i \in N_D} G_i^L P_{Di} \le \overline{P}_L$$

where $N_G$ represents a set of nodes connected to traditional energy power stations, $N_w$ represents a set of nodes connected to renewable energy power stations, $N_D$ represents a set of nodes connected to loads, $G_i^L$, $G_j^L$ represent power transfer distribution factors of an L-th transmission branch relative to an i-th node and a j-th node, respectively, $AG_i^I$ represents a sensitivity of the L-th transmission branch to the active power of an i-th node connected to a renewable energy power station, $P_{Gi}$ represents an actual output of an electric generator at an i-th node connected to a traditional energy power station, $\alpha_i$ represents an adjustment coefficient for an automatic generation control of the electric generator at the i-th connected to traditional energy power station, $w_{i,min}$ represents a minimum output of the renewable energy power station at the i-th node connected to a renewable energy power station, $w_{i,max}$ represents a maximum output of the renewable energy power station at the i-th node connected to a renewable energy power station, $u_0$ represents an actual output of the renewable energy power station, $P_{Di}$ represents a load power of the i-th node connected to a load;

$$AG_i^L = G_i^L - \sum_{j \in N_G} G_j^L \alpha_j,$$

where $\overline{P}_L$ represents a maximum allowable power of the L-th transmission branch, $\alpha_j$ represents an adjustment coefficient for an automatic generation control of the electric generator at the j-th node.

8. The scheduling method of claim 1, wherein the plurality of constraints further comprise a flexible direct current constraint;

wherein the flexible direct current constraint is expressed by:

$$p_z = p_{z,i} + p_{z,o}$$

$$p_z + l_z = 0$$

$$p_z \leq S_z$$

$$r \geq |l_z/S_{zl}|$$

$$r \leq 1$$

where $p_{z,i}$, $p_{z,o}$ represent an incoming power and an outgoing power of a flexible direct current bus Z, respectively, $p_z$ represents a direct current power of the flexible direct current bus Z, $l_z$ represents a transmission power of a flexible direct current transmission line connected to the flexible direct current bus Z, r represents a maximum load rate of the flexible direct current line, $S_z$ represents a capacity of a convertor station at the flexible direct current bus Z, $S_{zl}$ represents a capacity of the flexible direct current line connected to the flexible direct current bus Z.

9. A scheduling apparatus for a power system based on flexible high-voltage direct current (HVDC), comprising:
  a processor;
  a memory having executable instructions stored therein,
  wherein when the instructions are executed by the processor, the processor is caused to perform the scheduling method for a power system based on flexible HVDC comprising:
    establishing a scheduling model for the power system based on flexible HVDC, the power system including a pumped storage power station for stabilizing fluctuant of renewable energy power stations, the scheduling model comprising an objective function and a plurality of constraints; wherein the objective function of the scheduling model is configured for minimizing a total cost $S_{SUM}$ of the power system, and the objective function is expressed by:

$$\min\left[S_{SUM} = \sum_{i \in I} A_i(P_i) + \sum_{i \in G} G_i(P_{Gi}) + S_{pun}\right]$$

wherein the total cost contains a transmission cost, an electricity cost and a penalty term, the transmission cost is represented by $$\sum_{i \in I} A_i(P_i);$$

where $A_i$ represents a transmission cost function on an i-th transmission line in the power system, $P_i$ represents an active power on the i-th transmission line, and I represents a set of flexible direct current transmission branches;
  $A_i = R_i P_i^2$; where $R_i$ represents line loss on the i-th transmission line;
  wherein the electricity cost is represented by $$\sum_{i \in G} G_i(P_{Gi});$$

where G represents a set of nodes connected to electric generators in the power system, and $G_i$ represents an electricity cost function of an electric generator at an i-th node, $P_{Gi}$ represents an active power of the electric generator at the i-th node;
  $G_i = a_i P_{Gi}^2 + b_i P_{Gi} + c_i$; where $a_i, b_i, c_i$ represent electricity cost parameters of the electric generator at the i-th node, respectively;
  wherein the penalty term is a sum of an electricity abandoning penalty and a load tracking offset penalty, and is represented by $S_{pun} = S_1 + S_2$;
  wherein the plurality of constraints comprises a pumped storage power station constraint expressed by:

$$w_{u,t+1} - w_{u,t} = w_{h,t} - w_{g,t}$$

$$w_{u,min} \leq w_{u,t} \leq w_{u,max}$$

$$w_{l,t+1} - w_{l,t} = w_{g,t} - w_{h,t}$$

$$w_{l,min} \leq w_{l,t} \leq w_{l,max}$$

$$w_{h,t} = \eta_h p_{h,t}$$

$$p_{g,t} = \eta_g w_{g,t}$$

$$p_{ch,t} = B(t) p_{g,t}$$

$$P_{dis,t} = B(t) p_{g,t}$$

$$p_{ch,t} \geq 0$$

$$p_{dis,t} \geq 0$$

where $p_{g,t}$ represents a generating power of the pumped storage power station at the time point t, $w_{g,t}$ represents a water-use power of the pumped storage power station at the time point t, $\eta_g$ represents a generating efficiency of the pumped storage power station, $p_{h,t}$ represents an electricity-use power of the pumped storage power station at the time point t, $w_{h,t}$ represents a water-store power of the pumped storage power station at the time point t, $\eta_h$ represents a pumping efficiency of the pumped storage power station, $w_{u,t}$ represents a water storage of an upstream water reservoir at the time point t, $w_{u,t+1}$ represents a water storage of an upstream water reservoir at a time point t+1, $w_{u,max}$ represents a maximum water storage of the upstream water reservoir, $w_{u,min}$ represents a minimum water storage of the upstream water reservoir, $w_{l,t}$ represents a water storage of a downstream water reservoir at the time point t, $w_{l,t+1}$ represents a water storage of a downstream water reservoir at the time point t+1, $w_{l,max}$ represents a maximum water storage of the downstream water reservoir, $w_{l,min}$ represents a minimum water storage of the downstream water reservoir, $p_{ch,t}$ represents an incoming power of the pumped storage power station at the time point t, $p_{dis,t}$ represents an outgoing power of the pumped storage power station at the time point t, B represents a Boolean function;

solving the scheduling model to acquire an optimal active power $P_{Gi}$ of each electric generator at each node, an optimal power set value $w_{i,0}$ of each renewable energy power station at each node, an optimal generating power $p_{g,t}$ of the pumped storage power station at the time point t and an optimal transmission power $l_z$ of a flexible direct current transmission line connected to a flexible direct current bus Z; and operating the power system based on the optimal $P_{Gi}$, $w_{i,0}$, $p_{g,t}$, $l_z$.

10. The scheduling anuaratus of claim 9, wherein the electricity abandoning penalty is represented by $$S_1 = \alpha \left[ \sum_{j \in J} (P_j - p_j)^2 \right],$$

where $P_j$ represents an actual output of a j-th renewable energy power station, $p_j$ represents a predictive output of the j-th renewable energy power station; J represents of a set of renewable energy power stations; α represents a coefficient for the electricity abandoning penalty of the renewable energy power station.

11. The scheduling apparatus of claim 9, wherein the load tracking offset penalty is represented by $S_2 = \gamma (P_{b,t} - P_{b,t-1})^2$, $t \in T$, where γ represents a coefficient for the load tracking offset penalty, T represents a controlled time period, $P_{b,t}$ represents a load tracking value at the time point t, $P_{b,t-1}$ represents a load tracking value at a time point t−1.

12. The scheduling apparatus of claim 9, wherein the plurality of constraints further comprise an electric generator's power constraint;

wherein the electric generator's power constraint is expressed by:

$$P_{Gi,min} \leq P_{Gi} - \alpha_i (u_{max} - u_0)$$

$$P_{Gi} - \alpha_i (u_{min} - u_0) \leq P_{Gi,max}$$

where i is one element from a set G representing a set of nodes connected to electric generators, $P_{Gi,min}$, $P_{Gi,max}$ represent a minimum output and a maximum output of the electric generator at an i-th node, respectively, $P_{Gi}$ represents an active power of the electric generator at the i-th node, $\alpha_i$ represents an adjustment coefficient for an automatic generation control of the electric generator at the i-th node, $u_{max}$ represents a maximum output of a renewable energy power station, $u_{min}$ represents a minimum output of the renewable energy power station, $u_0$ represents an actual output of the renewable energy power station.

13. The scheduling apparatus of claim 9, wherein the plurality of constraints further comprise a renewable energy power station's power constraint;

wherein the renewable energy power station's power constraint is expressed by:

$$w_{i,min} \leq \underline{w}$$

$$w_{i,max} \leq \overline{w}$$

$$0 \leq w_{i,min} \leq w_{i,0} \leq w_{i,max}$$

$$u_0 = \sum_{i \in N_W} w_{i,0}$$

$$u_{max} = \sum_{i \in N_W} w_{i,max}$$

$$u_{min} = \sum_{i \in N_W} w_{i,min}$$

where $N_w$ represents a set of nodes connected to renewable energy power stations, $w_{i,0}$ represents a power set value of a renewable energy power station at an i-th node, $w_{i,min}$ represents a minimum output of the renewable energy power station at the i-th node, $w_{i,max}$ represents a maximum output of the renewable energy power station at the i-th node, $\underline{w}$ represents an lower limit of fluctuant of a renewable energy, $\overline{w}$ represents an upper limit of fluctuant of the renewable energy, $u_{max}$ represents a maximum output of the renewable energy power station, $u_{min}$ represents a minimum output of the renewable energy power station, $u_0$ represents an actual output of the renewable energy power station.

14. The scheduling apparatus of claim 9, wherein the plurality of constraints further comprise a whole system power balance constraint;

wherein the whole system power balance constraint is expressed by:

$$\sum_{i \in N_G} P_{Gi} + \sum_{i \in N_W} w_{i,0} = \sum_{i \in N_D} P_{Di}$$

where $N_D$ represents a set of nodes connected to loads, $N_G$ represents a set of nodes connected to traditional energy power stations, $N_w$ represents a set of nodes connected to renewable energy power stations, $P_{Gi}$ represents an actual output of the electric generator at an i-th node connected to a traditional energy power, $P_{Di}$ represents a load power of an i-th node connected to a load, $w_{i,0}$ represents a power set value of a renewable energy power station at an i-th node connected to a renewable energy power station.

15. The scheduling apparatus of claim 9, wherein the plurality of constraints further comprise a transmission power capacity constraint;

wherein the transmission power capacity constraint is expressed by:

$$-\overline{P}_L \leq \sum_{i \in N_G} G_i^L (P_{Gi} + \alpha_i u_0) +$$

$$\sum_{i \in N_W, AG_i^L > 0} AG_i^L w_{i,min} + \sum_{i \in N_W, AG_i^L < 0} AG_i^L w_{i,max} + \sum_{i \in N_D} G_i^L P_{Di}$$

$$\sum_{i \in N_G} G_i^L (P_{Gi} + \alpha_i u_0) + \sum_{i \in N_W, AG_i^L > 0} AG_i^L w_{i,max} +$$

$$\sum_{i \in N_W, AG_i^L < 0} AG_i^L w_{i,min} + \sum_{i \in N_D} G_i^L P_{Di} \leq \overline{P}_L$$

where $N_G$ represents a set of nodes connected to traditional energy power stations, $N_w$ represents a set of nodes connected to renewable energy power stations, $N_D$ represents a set of nodes connected to loads, $G_i^L$, $G_j^L$ represent power transfer distribution factors of an L-th transmission branch relative to an i-th node and a j-th node, respectively, $AG_i^l$ represents a sensitivity of the L-th transmission branch to the active power of an i-th node connected to a renewable energy power station, $P_{Gi}$ represents an actual output of an electric generator at an i-th node connected to a traditional energy power station, $\alpha_i$ represents an adjustment coefficient for an automatic generation control of the electric generator at the i-th connected to traditional energy power station, $w_{i,min}$ represents a minimum output of the renewable energy power station at the i-th node connected to a renewable energy power station, $w_{i,max}$ represents a maximum output of the renewable energy power station at the i-th node connected to a renewable energy power station, $u_0$ represents an actual output of the renewable energy power station, $P_{Di}$ represents a load power of the i-th node connected to a load;

$$AG_i^L = G_i^L - \sum_{j \in N_G} G_j^L \alpha_j,$$

where $\overline{P}_L$ represents a maximum allowable power of the L-th transmission branch, $\alpha_j$ represents an adjustment coefficient for an automatic generation control of the electric generator at the j-th node.

16. The scheduling apparatus of claim 9, wherein the plurality of constraints further comprise a flexible direct current constraint;
wherein the flexible direct current constraint is expressed by:

$$p_z = p_{z,i} + p_{z,o}$$

$$p_z + l_z = 0$$

$$p_z \leq S_z$$

$$r \geq |l_z/S_{zl}|$$

$$r \leq 1$$

where $p_{z,i}$, $p_{z,o}$ represent an incoming power and an outgoing power of a flexible direct current bus Z, respectively, $p_z$ represents a direct current power of the flexible direct current bus Z, $l_z$ represents a transmission power of a flexible direct current transmission line connected to the flexible direct current bus Z, r represents a maximum load rate of the flexible direct current line, $S_z$ represents a capacity of a convertor station at the flexible direct current bus Z, $S_{zl}$ represents a capacity of the flexible direct current line connected to the flexible direct current bus Z.

17. A non-transitory computer-readable storage medium having instructions stored therein, wherein when the instructions are executed by a processor, the processor is caused to perform the scheduling method for a power system based on flexible high-voltage direct current (HVDC), comprising:
establishing a scheduling model for the power system based on flexible HVDC, the power system including a pumped storage power station for stabilizing fluctuant of renewable energy power stations, the scheduling model comprising an objective function and a plurality of constraints; wherein the objective function of the scheduling model is configured for minimizing a total cost $S_{SUM}$ of the power system, and the objective function is expressed by:

$$\min \left[ S_{SUM} = \sum_{i \in I} A_i(P_i) + \sum_{i \in G} G_i(P_{Gi}) + S_{pun} \right]$$

wherein the total cost contains a transmission cost, an electricity cost and a penalty term, the transmission cost is represented by $$\sum_{i \in I} A_i(P_i);$$

where $A_i$ represents a transmission cost function on an i-th transmission line in the power system, $P_i$ represents an active power on the i-th transmission line, and I represents a set of flexible direct current transmission branches;
$A_i = R_i P_i^2$; where $R_i$ represents line loss on the i-th transmission line;
wherein the electricity cost is represented by $$\sum_{i \in G} G_i(P_{Gi});$$

where G represents a set of nodes connected to electric generators in the power system, and $G_i$ represents an electricity cost function of an electric generator at an i-th node, $P_{Gi}$ represents an active power of the electric generator at the i-th node;
$G_i = a_i P_{Gi}^2 + b_i P_{Gi} + c_i$; where $a_i, b_i, c_i$ represent electricity cost parameters of the electric generator at the i-th node, respectively;
wherein the penalty term is a sum of an electricity abandoning penalty and a load tracking offset penalty, and is represented by $S_{pun} = S_1 + S_2$;
wherein the plurality of constraints comprises a pumped storage power station constraint expressed by:

$$w_{u,t+1} - w_{u,t} = w_{h,t} - w_{g,t}$$

$$w_{u,min} \leq w_{u,t} \leq w_{u,max}$$

$$w_{l,t+1} - w_{l,t} = w_{g,t} - w_{h,t}$$

$$w_{l,min} \leq w_{l,t} \leq w_{l,max}$$

$$w_{h,t} = \eta_h p_{h,t}$$

$$p_{g,t} = \eta_g w_{g,t}$$

$$p_{ch,t} = B(t) p_{g,t}$$

$$p_{dis,t} = B(t) p_{g,t}$$

$$p_{ch,t} \geq 0$$

$$p_{dis,t} \geq 0$$

where $p_{g,t}$ represents a generating power of the pumped storage power station at the time point t, $w_{g,t}$ represents a water-use power of the pumped storage power station at the time point t, $\eta_g$ represents a generating efficiency of the pumped storage power station, $p_{h,t}$ represents an electricity-use power of the pumped storage power station at the time point t, $w_{h,t}$ represents a water-store power of the pumped storage power station at the time point t, $\eta_h$ represents a pumping efficiency of the pumped storage power station, $w_{u,t}$ represents a water storage of an upstream water reservoir at the time point t, $w_{u,t+1}$ represents a water storage of an upstream water reservoir at a time point t+1, $w_{u,max}$ represents a maximum water storage of the upstream water reservoir, $w_{u,min}$ represents a minimum water storage of the upstream water reservoir, $w_{l,t}$ represents a water storage of a downstream water reservoir at the time point t, $w_{l,t+1}$ represents a water storage of a downstream water reservoir at the time point t+1, $w_{l,max}$ represents a maximum water storage of the downstream water reservoir, $w_{l,min}$ represents a minimum water storage of the downstream water reservoir, $p_{ch,t}$ represents an incoming power of the pumped storage power station at the time point t, $p_{dis,t}$ represents an outgoing power of the pumped storage power station at the time point t, B represents a Boolean function;

solving the scheduling model to acquire an optimal active power $P_{Gi}$ of each electric generator at each node, an optimal power set value $w_{i,0}$ of each renewable energy power station at each node, an optimal generating power $p_{g,t}$ of the pumped storage power station at the time point t and an optimal transmission power $l_z$ of a flexible direct current transmission line connected to a flexible direct current bus Z; and operating the power system based on the optimal $P_{Gi}$, $w_{i,0}$, $p_{g,t}$, $l_z$.

\* \* \* \* \*